United States Patent
Kim et al.

(10) Patent No.: US 10,230,084 B2
(45) Date of Patent: Mar. 12, 2019

(54) SWELLING TAPE FOR FILLING GAP

(71) Applicant: LG CHEM, LTD., Seoul (KR)

(72) Inventors: Se Ra Kim, Daejeon (KR); Suk Ky Chang, Daejeon (KR); Hyo Sook Joo, Daejeon (KR); Yoon Tae Hwang, Daejeon (KR); Se Woo Yang, Daejeon (KR); Joon Hyung Kim, Daejeon (KR); Sung Jong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 223 days.

(21) Appl. No.: 14/042,187

(22) Filed: Sep. 30, 2013

(65) Prior Publication Data
US 2014/0106207 A1 Apr. 17, 2014

Related U.S. Application Data

(63) Continuation of application No. PCT/KR2012/002584, filed on Apr. 5, 2012.

(30) Foreign Application Priority Data

Apr. 5, 2011 (KR) .................. 10-2011-0031314
Apr. 5, 2012 (KR) .................. 10-2012-0035446

(51) Int. Cl.
*H01M 2/14* (2006.01)
*H01M 10/04* (2006.01)
(Continued)

(52) U.S. Cl.
CPC ............. *H01M 2/1094* (2013.01); *C09J 7/22* (2018.01); *H01M 2/14* (2013.01); *H01M 2/16* (2013.01);
(Continued)

(58) Field of Classification Search
CPC ........ H01M 2/1094; H01M 2/14; H01M 2/16; H01M 10/0422
See application file for complete search history.

(56) References Cited

U.S. PATENT DOCUMENTS 8,048,559 B2 11/2011 Kim
2009/0250136 A1 10/2009 Roberts et al.
(Continued)

FOREIGN PATENT DOCUMENTS

CN 1992393 A 7/2007
EP 1486548 A1 12/2004
(Continued)

OTHER PUBLICATIONS

Leong, et al.: "The Viscoelastic Properties of Natural Rubber Pressure-Sensitive Adhesive Using Acrylic Resin as a Tackifier", XP-002729112, Journal of Applied Polymer Science, vol. 88, No. 8, Mar. 6, 2003, pp. 2118-2123.
(Continued)

*Primary Examiner* — Ula C Ruddock
*Assistant Examiner* — Frank A Chernow
(74) *Attorney, Agent, or Firm* — Dentons US LLP (57) ABSTRACT

A swelling tape for filling a gap, a method of manufacturing the swelling tape for filling a gap, a method of filling a gap, an electrode assembly and a secondary battery are provided. For example, the swelling tape can be applied inside a gap in which a fluid exists so as to fill the gap by becoming a 3D form, and can be useful at anchoring a subject in which the gap is formed, as necessary.

13 Claims, 6 Drawing Sheets

(51) Int. Cl.
    *H01M 2/10* (2006.01)
    *H01M 2/34* (2006.01)
    *H01M 2/16* (2006.01)
    *C09J 7/22* (2018.01)

(52) U.S. Cl.
    CPC ......... *H01M 2/347* (2013.01); *H01M 10/049* (2013.01); *H01M 10/0422* (2013.01); *H01M 10/0431* (2013.01); *C09J 2201/28* (2013.01); *C09J 2201/606* (2013.01); *C09J 2203/33* (2013.01); *C09J 2401/006* (2013.01); *C09J 2433/006* (2013.01); *C09J 2463/006* (2013.01); *C09J 2475/006* (2013.01); *Y10T 428/24802* (2015.01)

(56) References Cited

U.S. PATENT DOCUMENTS

| | | |
|---|---|---|
| 2011/0008672 A1 | 1/2011 | Kim |
| 2011/0091756 A1* | 4/2011 | Suzuki et al. .................. 429/94 |
| 2012/0040152 A1 | 2/2012 | Hannington |
| 2013/0280570 A1 | 10/2013 | Kim et al. |
| 2013/0305526 A1 | 11/2013 | Kim et al. |
| 2013/0306221 A1 | 11/2013 | Kim et al. |
| 2014/0106207 A1 | 4/2014 | Kim et al. |

FOREIGN PATENT DOCUMENTS

| | | |
|---|---|---|
| EP | 1804320 A2 | 7/2007 |
| EP | 2273599 | 1/2011 |
| EP | 2276097 A1 | 1/2011 |
| JP | 63-196679 A | 8/1988 |
| JP | 63-238184 A | 10/1988 |
| JP | 06150971 A | 5/1994 |
| JP | 06181058 | 6/1994 |
| JP | 2000-44903 A | 2/2000 |
| JP | 2001273933 | 10/2001 |
| JP | 2001273933 A | 10/2001 |
| JP | 2003151634 | 5/2003 |
| JP | 2003-531253 A | 10/2003 |
| JP | 2005-200499 A | 7/2005 |
| JP | 2014-516373 A | 7/2014 |
| KR | 1020060022126 A | 3/2006 |
| KR | 100719725 B1 | 5/2007 |
| KR | 10-2007-0096649 | 10/2007 |
| KR | 1020070096649 A | 10/2007 |
| KR | 1020090085207 A | 8/2009 |
| TW | 201245386 A1 | 11/2012 |
| TW | 201248973 A1 | 12/2012 |

OTHER PUBLICATIONS

Czech, et al.: "Development trends on pressure-sensitive adhesive systems", XP-002729113, Materials Science—Poland, vol. 23, No. 4, Dec. 31, 2005, pp. 1015-1022.

* cited by examiner

SWELLING TAPE FOR FILLING GAP

This application is a Continuation Bypass Application of International Patent Application No. PCT/KR2012/002584, filed Apr. 5, 2012, which claims priority to and the benefit of Korean Patent Application Nos. 10-2011-0031314, filed Apr. 5, 2011, and 10-2012-0035446, filed Apr. 5, 2012, in the Korean Intellectual Property Office, the disclosures of which are incorporated herein by reference in their entirety.

TECHNICAL FIELD

The present application relates to a swelling tape for filling a gap, a method of manufacturing the swelling tape for filling a gap, a method of filling a gap, an electrode assembly and a secondary battery.

BACKGROUND ART

In general, there are many cases in which a gap formed between two spaced subjects has to be filled. There are also many cases in which it is necessary that the two spaced subjects be fixed by filling the gap.

For example, an electrode assembly generally has a smaller size than a cylindrical can when the electrode assembly is accommodated in the cylindrical can to manufacture a battery. Thus, a gap is formed between the electrode assembly and an internal wall of the can. In this case, the electrode assembly accommodated in the can may move inside the can due to an external vibration or impact. The movement of the electrode assembly may cause problems such as an increase in internal resistivity and damage to an electrode tab in the battery, thereby significantly reducing the performance of the battery. Accordingly, it is necessary to fill the gap and fix the electrode assembly.

DISCLOSURE

Technical Problem

The present application provides a swelling tape for filling a gap, a method of manufacturing a swelling tape for filling a gap, a method of filling a gap, an electrode assembly and a secondary battery.

Technical Solution

According to exemplary embodiment, a swelling tape for filling a gap includes a substrate layer and a pressure-sensitive adhesive layer formed on at least one surface of the substrate layer. The substrate layer may be, for example, a substrate layer having a property of deforming in a longitudinal direction when coming in contact with a fluid such as a liquid. According to one exemplary embodiment, the substrate layer may be, for example, a substrate layer having a property of swelling in a longitudinal direction when coming in contact with the fluid.

Throughout this specification, the term "swelling tape for filling a gap" may mean a tape that functions to fill a gap between two subjects that are spaced apart from each other, and anchor the two subjects to each other, as necessary. According to one exemplary embodiment, the swelling tape may be a tape that may realize a three-dimensional (3D) shape by which the gap may be filled by means of the reciprocal balance between an anchoring force of a pressure-sensitive adhesive layer and a force generated as a substrate layer swells, for example, when the substrate layer comes in contact with a fluid such as a liquid in a state in which the tape is attached via the pressure-sensitive adhesive layer to one of the two subjects having the gap formed therebetween. According to one exemplary embodiment, the two subjects that are spaced apart to form the gap may be an electrode assembly of a battery and a can configured to accommodate the electrode assembly, respectively, but the present invention is not limited thereto. In this case, the tape may be, for example, a swelling tape for electrode assemblies, and may be used to prevent disassembly of the electrode assembly and also anchor the electrode assembly inside a can of a battery.

Figure 1:
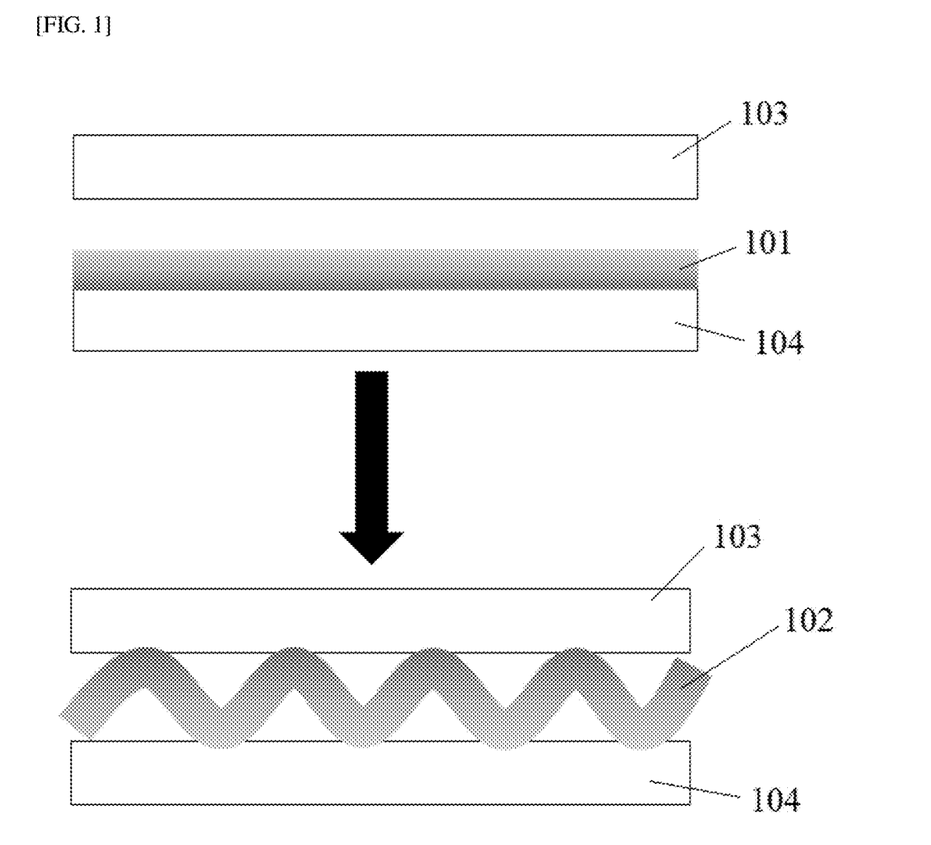
FIG. 1 is a schematic diagram showing a process of forming a swelling tape into a 3D form.

FIG. 1 is a schematic diagram showing how the swelling tape fills a gap by becoming a 3D form inside the gap.

As shown in FIG. 1, the tape (101) is attached via a pressure-sensitive adhesive layer to one subject (104) of two subjects (103, 104) having a gap formed therebetween. A fluid is introduced within the gap in the attached state described above, thereby contacting a substrate layer of the swelling tape (101) and causing the substrate layer to swell in a longitudinal direction, for example. In this case, the swelling tape (102) may realize a 3D shape because the substrate layer is swelled in a state in which the tape (101) is fixed to the subject (104) via the pressure-sensitive adhesive layer. The gap may be filled by the above-described 3D shape and the two subjects (103, 104) having the gap formed therebetween may be fixed to each other as necessary.

As such, a size of the 3D form realized by the swelling tape, that is, a width of the gap, may be, for example, in a range of 0.001 mm to 2.0 mm, 0.001 mm to 1.0 mm, or 0.01 mm to 0.5 mm. The size of the 3D form may vary according to specific kinds of the gap to which the swelling tape is applied, but the present invention is not particularly limited thereto. The size of the 3D form according to the size of the gap to which the swelling tape is applied may be, for example, controlled by regulating a modification rate of the substrate layer or a peel strength or pattern shape of the pressure-sensitive adhesive layer, for example, an area ratio of pressure-sensitive adhesive regions or a distance between the pressure-sensitive adhesive regions, as will be described later.

Throughout this specification, the term "longitudinal direction" of the term substrate layer may mean a direction perpendicular to a thickness direction (for example, a direction indicated by an arrow shown in FIG. 2 or 3) when the substrate layer is maintained flat. Throughout this specification, the term "perpendicular" or "parallel" may mean substantially perpendicular or parallel without diminishing desired effects, and, for example, may include an error of not more than ±10°, not more than ±5°, or not more than ±3°.

A substrate layer that may deform on a plane of a substrate layer in a certain direction (including a cross direction, a machine direction or a diagonal direction), may be used without limitation as long as the substrate layer has a property of deforming, for example, swelling, in a longitudinal direction.

According to one exemplary embodiment, the substrate layer may have a modification rate in a longitudinal direction, defined by the following Equation 1, of 10% or more.

$$\text{Modification rate of substrate layer in longitudinal direction} = (L_2 - L_1)/L_1 \times 100 \quad \text{Equation 1}$$

In Equation 1, $L_1$ represents an initial length of the substrate layer before the substrate layer comes in contact with a fluid, and $L_2$ represents a length of the substrate layer measured after the substrate layer comes in contact with the fluid at room temperature or 60° C. for 24 hours.

For the calculation according to Equation 1, specific kinds of the fluid with which the substrate layer comes in contact may be selected according to specific conditions of a gap to be filled, but the present invention is not particularly limited thereto. According to one exemplary embodiment, when the gap to be filled is a gap formed by an electrode assembly and a can configured to accommodate the electrode assembly, the fluid may be a liquid-phase electrolyte injected into the can. The term "electrolyte" may refer to an ion conduction medium used in, for example, a battery.

Also, throughout this specification, the term "room temperature" may mean a naturally occurring temperature that is neither heated nor cooled, for example, a temperature of about 10° C. to about 30° C., about 20° C. to about 30° C., about 25° C. or about 23° C.

The modification rate, for example, a swelling rate, of the substrate layer in the longitudinal direction may vary according to the size of the 3D form to be realized, and may be, for example, 30% or more, 40% or more, 50% or more, 60% or more, 70% or more, 80% or more, or 90% or more. An upper limit of the modification rate of the substrate layer in the longitudinal direction is not particularly limited. In other words, the higher a value of the modification rate is, the larger the 3D shape may be realized, and thus the modification rate may be, for example, controlled according to the size of a desired 3D shape. For example, an upper limit of the modification rate of the substrate layer may be 500%.

In Equation 1, $L_1$ and $L_2$ represent lengths of a substrate layer before and after the substrate layer comes in contact with a fluid. The lengths of the substrate layer are measured in a predetermined direction with respect to the substrate layer. In this case, a specific direction in which the lengths are measured is not particularly limited as long as the same direction is applied to measure the lengths $L_1$ and $L_2$.

For example, when the substrate layer has a rectangular sheet shape, a length of the substrate layer may be a cross, machine or diagonal length of the sheet, or a length on a plane in a certain direction. However, the same direction in which the lengths are measured is applied to measure the lengths $L_1$ and $L_2$. For example, when a cross length of the substrate layer is used as $L_1$, a cross length of the substrate layer is used as $L_2$.

A shape of the substrate layer is not particularly limited, and may be, for example, a film or sheet shape. Also, the substrate layer having a film or sheet shape may have a shape such as a tetragonal, circular, triangular or amorphous shape.

Any materials for the substrate layer may be used without limitation as long as they have the above-described modification rate. According to one exemplary embodiment, the substrate layer may be a polymer film or sheet. Also, the substrate layer may be a polymer film or sheet which is manufactured to show a deformation property, for example, a swelling property as described above, when the substrate layer comes in contact with the fluid under elongation or shrinking conditions during manufacture of a battery.

According to one exemplary embodiment, a substrate layer having a urethane bond, an ester bond or an ether bond, or including a cellulose ester compound, may be used as the substrate layer.

The substrate layer that may be used herein may include an acrylate-based substrate layer, a urethane-based substrate layer, an epoxy-based substrate layer or a cellulose-based substrate layer.

According to one exemplary embodiment, a cast layer formed of an active energy ray-curable composition may be used as the acrylate-based, urethane-based or epoxy-based substrate layer.

Throughout this specification, the term "cast layer" may refer to a substrate layer formed by coating a curable composition using a casting method and curing the coated layer. Also, the term "active energy ray-curable composition" may refer to a type of a composition cured by irradiation with active energy rays. The scope of the active energy rays may include particle beams such as alpha-particle beams, proton beams, neutron beams or electron beams, as well as microwaves, infrared rays (IR), UV rays (UV), X rays and gamma rays.

The composition may, for example, include an active energy ray-curable acrylate compound and a radical-polymerizable diluent.

As such, urethane acrylate, known as a photocurable oligomer in the art, may be, for example, used as the active energy ray-curable acrylate compound.

For example, the urethane acrylate that may be used herein may include a reaction product of a mixture including a polyisocyanate compound and a (meth)acrylate having a hydroxyl group. The polyisocyanate compound may be a compound having at least two isocyanate groups. For example, the polyisocyanate compound that may be used herein may include aliphatic, cycloaliphatic or aromatic polyisocyanate, and, more particularly, 2,4-tolylene diisocyanate, 2,6-tolylene diisocyanate, 1,3-xylylene diisocyanate, 1,4-xylene diisocyanate or diphenylmethane-4,4'-diisocyanate isophorone diisocyanate. Also, the (meth)acrylate having a hydroxyl group that may be used herein may also include a hydroxyalkyl(meth)acrylate such as 2-hydroxyethyl(meth)acrylate, 2-hydroxypropyl(meth)acrylate, 4-hydroxybutyl(meth)acrylate, 6-hydroxyhexyl(meth)acrylate or 8-hydroxyoctyl(meth)acrylate, but the present invention is not limited thereto.

The urethane acrylate may include, for example, a reactant including a (meth)acrylate having a hydroxyl group and a urethane prepolymer having an isocyanate group at the end thereof, for example, a reactant of the mixture including a polyisocyanate and an ester polyol. The ester polyol that may be used herein may, for example, include a polyol and/or ether polyol, and a reaction product obtained by esterification with an acid component such as a dibasic acid or an anhydride thereof. The polyol that may be used herein may include ethyleneglycol, propyleneglycol, cyclohexane dimethanol and 3-methyl-1,5-pentanediol, and the ether polyol that may be used herein may include a polyalkyleneglycol such as polyethyleneglycol, polypropyleneglycol or polytetramethyleneglycol, or a diol of a block or random polymer such as a diol of a polyethylene polypropoxy block polymer. Also, the acid component that may be used herein may include a dibasic acid such as adipic acid, succinic acid, phthalic acid, tetrahydrophthalic acid, hexahydrophthalic acid and terephthalic acid, or an anhydride thereof, but the present invention is not limited thereto. Further, the above-described compounds may be used as the polyisocyanate and the (meth)acrylate having a hydroxyl group.

Also, a reaction product of a mixture including a urethane prepolymer having an isocyanate group at the end thereof and a (meth)acrylate having a hydroxyl group, for example, a reaction product of a mixture including ether polyol and polyisocyanate, may be used as the urethane acrylate.

Also, epoxy acrylate, polyester acrylate or polyether acrylate may be also used as the active energy ray-curable acrylate compound.

A dehydration/condensation reaction product of a mixture including an ester polyol and (meth)acrylic acid may be, for example, used as the polyester acrylate. In this case, the ester polyol that may be used herein may, for example, include the compounds described above.

Also, the polyether acrylate that may be used herein may include a polyalkyleneglycol di(meth)acrylate such as polyethyleneglycol di(meth)acrylate, polypropyleneglycol di(meth)acrylate or polytetramethyleneglycol di(meth)acrylate, and the epoxy acrylate that may be used herein may include an addition reaction product of a mixture of an epoxy resin and a (meth)acrylic acid. In this case, kinds of the epoxy resin are not particularly limited, but conventional aromatic or aliphatic epoxy resins known in the art may be used.

A monomer having a functional group that may participate in radical polymerization by irradiation with active energy rays may be, for example, used as the radical-polymerizable diluent included in the composition.

Such a monomer that may be used herein is a (meth)acrylic acid ester monomer, and may be at least one selected from the group consisting of alkyl(meth)acrylate, (meth)acrylate having an alkoxy group, (meth)acrylate having an alicyclic group, (meth)acrylate having an aromatic group, (meth)acrylate having a heterocyclic group, and a multifunctional acrylate.

As such, the alkyl(meth)acrylate that may be used herein may include an alkyl(meth)acrylate having an alkyl group having 1 to 20 carbon atoms such as methyl(meth)acrylate, ethyl(meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl (meth)acrylate, isooctyl(meth)acrylate, isononyl(meth) acrylate, lauryl(meth)acrylate and tetradecyl(meth)acrylate, the (meth)acrylate having an alkoxy group that may be used herein may include 2-(2-ethoxyethoxy)ethyl(meth)acrylate, ethyleneglycol phenyl ether(meth)acrylate, polyethyleneglycol (polymerization degree: 2 to 8) phenyl ether (meth)acrylate, ethyleneglycol nonyl phenyl ether(meth) acrylate or polyethyleneglycol (polymerization degree: 2 to 8) nonyl phenyl ether(meth)acrylate, the (meth)acrylate having an alicyclic group that may be used herein may include isobornyl(meth)acrylate, dicyclopentenyl(meth)acrylate or dicyclopentenyloxy(meth)acrylate, the (meth)acrylate having an aromatic group that may be used herein may include phenylhydroxypropyl(meth)acrylate or benzyl(meth)acrylate, the (meth)acrylate having a heterocyclic group that may be used herein may include tetrahydrofurfuryl(meth)acrylate or morpholinyl(meth)acrylate, and the multifunctional acrylate that may be used herein may include a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth) acrylate or 9,9-bis[4-(2-acryloyloxyethoxy)phenyl]fluorene; a trifunctional acrylate such as trimethylolpropane tri(meth) acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane(meth)acrylate (for example, a reaction product of an isocyanate monomer and a trimethylolpropane tri(meth)acrylate), but the present invention is not limited thereto.

Also, a monomer having a polar functional group, more particularly, a hydroxyl group, a carboxyl group, a nitrogen-containing group or a glycidyl group, may be used as the diluent. As such, the monomer having a hydroxyl group may include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate, the monomer having a carboxyl group may include (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid or a maleic anhydride, the monomer having a nitrogen-containing group may include (meth)acrylamide, N-vinylpyrrolidone or N-vinylcaprolactam, and the monomer having a glycidyl group may include glycidyl(meth)acrylate, but the present invention is not limited thereto.

For example, the acrylic composition may include the active energy ray-curable acrylate compound at 30 parts by weight to 99 parts by weight and the radical-polymerizable diluent at 1 part by weight to 70 parts by weight. However, the weight ratio and kinds of the acrylate compound and the radical-polymerizable diluent may vary, for example, in consideration of a desired modification rate.

Unless otherwise particularly defined in this specification, the unit "part(s) by weight" refers to a weight ratio.

Also, the acrylic composition may further include a photoinitiator. The photoinitiator may induce a polymerization reaction of the acrylic composition by irradiation with active energy rays.

For example, a known photoinitiator such as a benzoin-based, hydroxyketone-based, aminoketone-based, peroxide-based or phosphine oxide-based photoinitiator may be used as the photoinitiator.

The acrylic composition may include the photoinitiator at a content of 0.01 parts by weight to 10 parts by weight or 0.1 parts by weight to 5 parts by weight, relative to 100 parts by weight of a sum of the acrylate compound and diluent. The content of the photoinitiator may be controlled within a content range so that an effective curing reaction can be induced and degradation of physical properties caused by components remaining after a curing process can be prevented.

The composition may further include at least one additive selected from the group consisting of a dye, a pigment, an epoxy resin, a cross-linking agent, a UV stabilizer, an antioxidant, a toning agent, a reinforcing agent, a filler, an antifoaming agent, a surfactant, a photo thickener and a plasticizer, as necessary.

The cast layer may be prepared by coating the composition to a proper thickness using a casting method and curing the composition through polymerization by irradiation with active energy rays.

A specific method of casting the composition is not particularly limited, but may be, for example, performed in consideration of a desired thickness using a method such as bar coating, knife coating, roll coating, spray coating, gravure coating, curtain coating, comma coating or lip coating.

Also, the irradiation with active energy rays, for example, UV rays, may be, for example, performed using a metal halide lamp, a high-pressure mercury lamp, a black light lamp, an electrodeless lamp or a xenon lamp. As such, the conditions of the irradiation with active energy rays, for example, wavelength or light intensity, are not particularly limited, but may be selected in consideration of components of the composition.

Also, a substrate layer including a urethane resin such as thermoplastic polyurethane (TPU), or a cast layer of a curable urethane composition may be used as the urethane substrate layer.

As such, the curable urethane composition is a kind of a composition cured by application of heat. For example, a composition including a polyol and an isocyanate compound may be used as the curable urethane composition.

As such, the polyol that may be used herein may, for example, include an alkyleneglycol, a dialkyleneglycol, a benzenediol (for example, catechol, resorcinol or hydroquinone), a benzenetriol (for example, 1,2,3-benzenetriol), dialcohol amine, trialcohol amine, arabitol, mannitol, isomalt, glycerol, xylitol, sorbitol, maltitol, erythritol, ribitol, dulcitol, lactitol, threitol, iditol or polyglycitol. Also, the isocyanate compound that may be used herein may, for example, include the polyisocyanates listed in the kinds of the urethane acrylate. An alkylene included in the alkyleneglycol or dialkyleneglycol, which may be used herein, may include an alkylene having 1 to 20 carbon atoms, 1 to 16 carbon atoms, 1 to 12 carbon atoms, 1 to 8 carbon atoms or 1 to 4 carbon atoms.

For example, the curable urethane composition may include the polyol and the polyisocyanate so that a hydroxyl group (OH) of the polyol and an isocyanate group (NCO) of the polyisocyanate can be present in a substantially equivalent ratio of approximately 1:1. However, the equivalent ratio may be, for example, varied in consideration of a desired modification rate.

For example, the cast layer may be prepared in a manner similar to that for the acrylic composition by casting the urethane composition and curing the cast coating layer by proper application of heat.

When a cellulose-based substrate layer is used as the substrate layer, for example, a substrate layer prepared by subjecting a mixture including a cellulose acetate resin or a cellulose alkylate resin to an extrusion or casting process may be used as the substrate layer including the resin. As such, cellulose acetate propionate or cellulose acetate butylate may be, for example, used as the cellulose alkylate.

A method of preparing a substrate layer using the resin is not particularly limited. For example, the method may be performed using a method of subjecting a source material including the resin and optionally a known additive to a conventional method of shaping a film or sheet, such as extrusion or casting. In this case, a method of performing proper treatments may be used in the shaping process so that the substrate layer can show a deforming property, for example, a swelling property, as described above.

When such a substrate layer has a sheet or film shape, a thickness of the substrate layer is not particularly limited. For example, the thickness of the substrate layer may be selected in consideration of the probability of realizing a desired 3D shape or the size of a gap to be filled.

The tape may include a pressure-sensitive adhesive layer formed on at least one surface of the substrate layer. The pressure-sensitive adhesive layer may be, for example, formed on one surface of the substrate layer in a direction parallel to the longitudinal direction of the above-described substrate layer.

When the tape comes in contact with a fluid in a state in which the tape is anchored via the pressure-sensitive adhesive layer formed in a direction parallel to the longitudinal direction of the substrate layer as described above, the tape swells, so that a 3D form protruding in a direction perpendicular to the longitudinal direction of the substrate layer can be realized.

The pressure-sensitive adhesive layer may include a pressure-sensitive adhesive region and a non-pressure-sensitive adhesive region. Each of the regions may be formed on a surface of the pressure-sensitive adhesive layer. The surface of the pressure-sensitive adhesive layer refers to a surface of the pressure-sensitive adhesive layer that is attached to a subject such as an electrode assembly having a gap formed therein when the tape is applied to one subject, for example, the electrode assembly.

Figure 2:
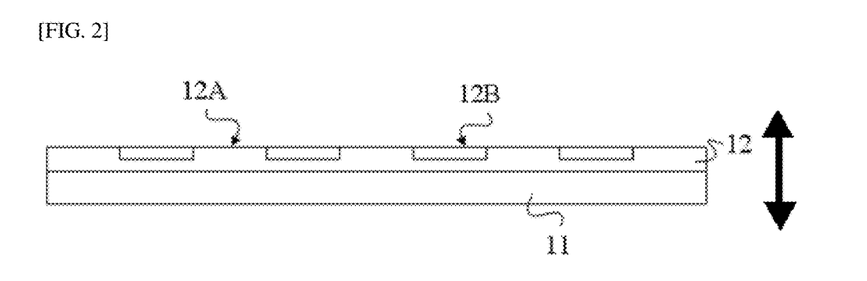
FIGS. 2 and 3 are cross-sectional views of a swelling tape according to exemplary embodiments.
Figure 3:
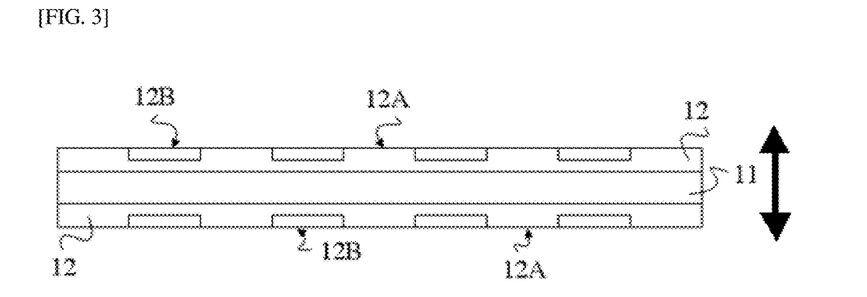

FIGS. 2 and 3 are cross-sectional views showing a swelling tape according to one exemplary embodiment. That is, FIG. 2 shows a swelling tape in which a pressure-sensitive adhesive layer (12) is formed on one surface of a substrate layer (11), and FIG. 3 shows a swelling tape in which pressure-sensitive adhesive layers (12) are formed on both surfaces of the substrate layer (11). As shown in FIGS. 2 and 3, both of a pressure-sensitive adhesive region (12A) and a non-pressure-sensitive adhesive region (12B) are formed on a surface of the pressure-sensitive adhesive layer (12) of the swelling tape. A ratio of an area of the pressure-sensitive adhesive region to the entire area of the surface of the pressure-sensitive adhesive layer may be in a range of 5% to 95%. Here, a lower limit of the ratio may be, for example, 10%, 15% or 20%. Also, an upper limit of the ratio may be, for example, 90%, 85%, 80%, 75%, 70%, 65% or 60%. However, the ratio is just one exemplary embodiment. For example, when the size of the 3D form to be realized by the tape is high compared with the pressure-sensitive adhesive strength of the swelling tape, the area ratio may be designed to be relatively small. On the other hand, it is possible to design the area ratio to be relatively large. The area ratio may be properly adjusted in consideration of the above-described context, depending on the characteristics required for a subject to which the tape is applied.

Also, shapes and patterns of the pressure-sensitive adhesive region and the non-pressure-sensitive adhesive region in the surface of the pressure-sensitive adhesive layer are not particularly limited. The shapes and patterns of the pressure-sensitive adhesive region and the non-pressure-sensitive adhesive region may be adjusted in consideration of a kind of a subject to which the swelling tape is applied, a shape of a surface to be attached to, and a 3D structure formed by the swelling tape.

The pressure-sensitive adhesive layer may include two or more pressure-sensitive adhesive regions. That is, two or more pressure-sensitive adhesive regions may be present on a surface of the pressure-sensitive adhesive layer. In this case, a distance between the pressure-sensitive adhesive regions may be, for example, in a range of 0.1 mm to 10 mm. As such, the distance may refer to a distance, for example, represented by "l" in FIGS. 4 to 6. However, the distance may vary according to a specific subject to which the swelling tape is applied, as listed in the items regarding the area ratio of the pressure-sensitive adhesive.

Figure 4:
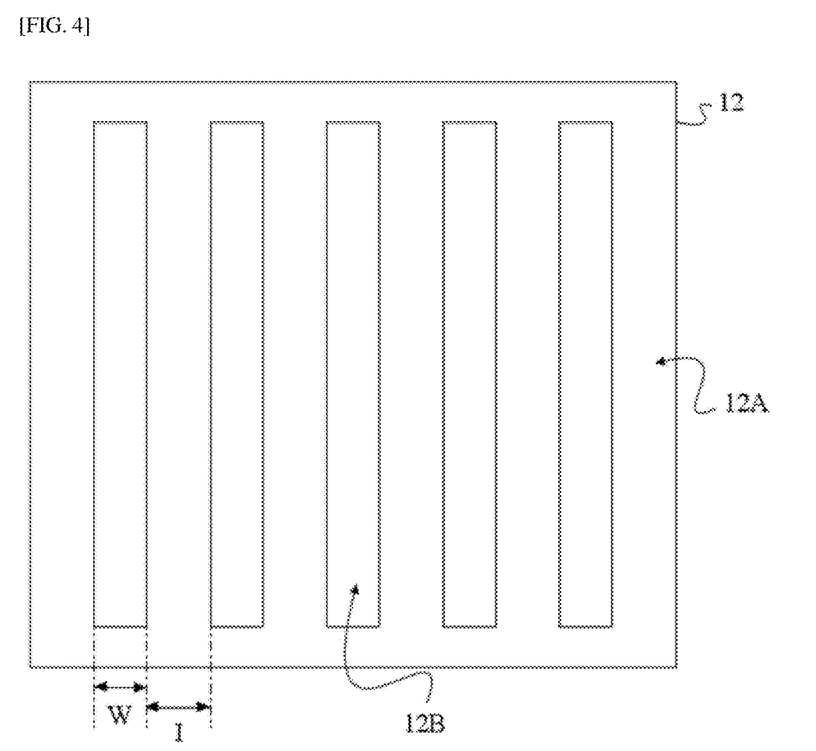
FIGS. 4 to 6 are schematic diagrams showing a surface of a pressure-sensitive adhesive layer.
Figure 5:
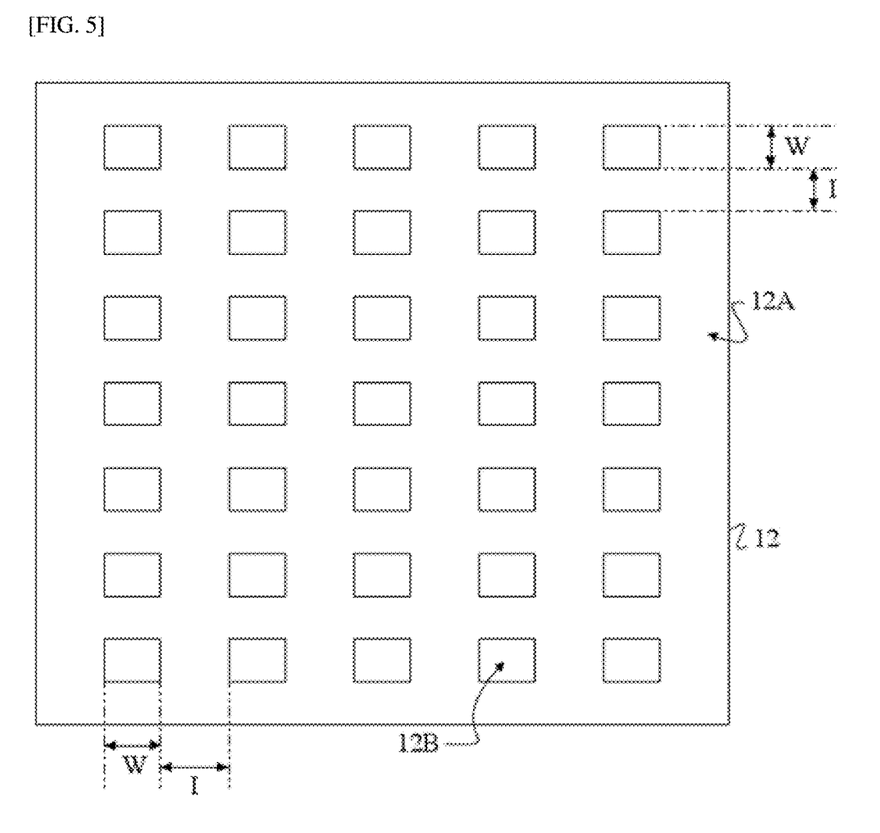
Figure 6:
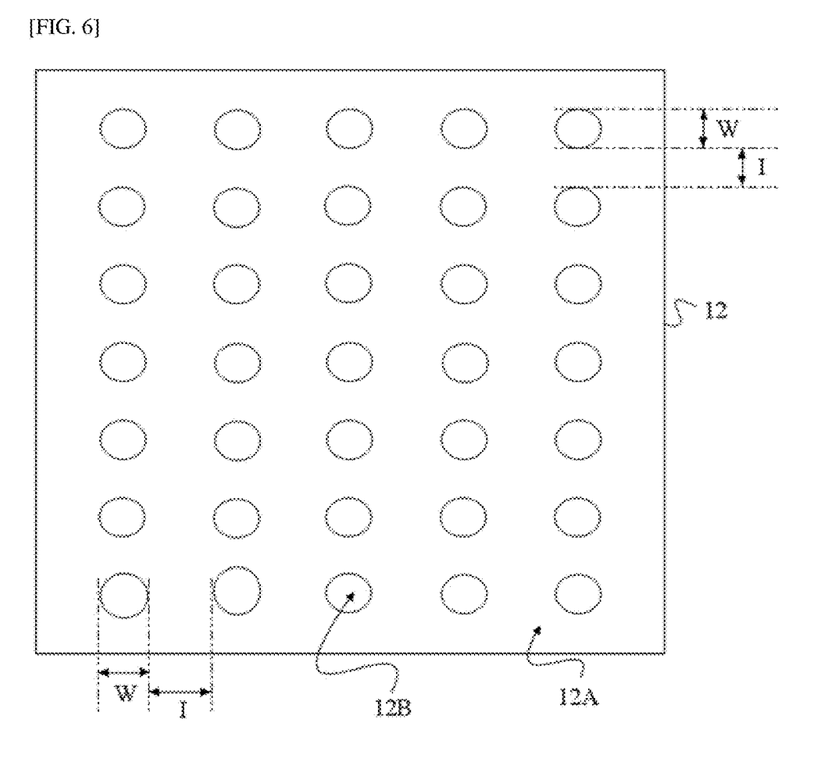

Also, a width of the pressure-sensitive adhesive region in the surface of the pressure-sensitive adhesive layer, for example, a distance of a portion represented by "W" in FIGS. 4 to 6, is not particularly limited. For example, the width of the pressure-sensitive adhesive region may be properly adjusted in consideration of the area ratio of the pressure-sensitive adhesive or the distance between the pressure-sensitive adhesive regions.

According to one exemplary embodiment, the pressure-sensitive adhesive region or the non-pressure-sensitive adhesive region may be disposed to form a striped pattern on a surface of the pressure-sensitive adhesive layer. FIG. 4 is a diagram showing one exemplary embodiment in which a non-pressure-sensitive adhesive region (12B) is disposed to form a striped pattern on a surface of the pressure-sensitive adhesive layer (12). Although FIG. 4 shows a case in which the non-pressure-sensitive adhesive region (12B) is disposed to form a precise striped pattern, the striped pattern may be somewhat irregular as long as it is roughly striped.

According to another exemplary embodiment, the pressure-sensitive adhesive region and the non-pressure-sensitive adhesive region may be formed in a sea island pattern on the surface of the pressure-sensitive adhesive layer. As such, the term "sea island pattern" means a shape in which one of the pressure-sensitive adhesive region and the non-pressure-sensitive adhesive region forms an island which is surrounded by the other which forms a sea. In this case, a shape of the region forming the island may include various shapes such as circular, oval, tetragonal, triangular and amorphous shapes. FIGS. 5 and 6 are schematic diagrams showing the non-pressure-sensitive adhesive region (12B) forming a tetragonal or circular island surrounded by the pressure-sensitive adhesive region (12A) forming a sea.

For example, the non-pressure-sensitive adhesive region may be formed by coating a surface of the pressure-sensitive adhesive layer with a non-pressure-sensitive adhesive material and partly masking the pressure-sensitive adhesive layer. That is, the swelling tape may further include a non-pressure-sensitive adhesive material forming a non-pressure-sensitive adhesive region on a surface of the pressure-sensitive adhesive layer by partly masking the pressure-sensitive adhesive layer. As such, the non-pressure-sensitive adhesive material that may be used herein may, for example, include an acrylic compound, but the present invention is not limited thereto. For example, the acrylic compound may be an acrylic-polymerizable, oligomeric or monomeric compound having a glass transition temperature at which pressure-sensitive adhesive properties are not exhibited.

According to another exemplary embodiment, the non-pressure-sensitive adhesive region of the pressure-sensitive adhesive layer may be one surface of the same pressure-sensitive adhesive layer whose elastic modulus is adjusted to a high level compared with the other surfaces. For example, such a non-pressure-sensitive adhesive region may be partially formed using a method of adjusting a curing degree of the pressure-sensitive adhesive layer to a high level when the pressure-sensitive adhesive layer is formed by curing the pressure-sensitive adhesive composition, as will be described later. According to still another exemplary embodiment, such a pressure-sensitive adhesive layer having the pressure-sensitive adhesive region and the non-pressure-sensitive adhesive region may be formed by partly coating a substrate layer with the pressure-sensitive adhesive composition and curing the pressure-sensitive adhesive composition when the pressure-sensitive adhesive layer is formed by coating the substrate layer with the pressure-sensitive adhesive composition and curing the pressure-sensitive adhesive composition, as will be described later. In this case, the non-pressure-sensitive adhesive region may refer to a region in which a pressure-sensitive adhesive layer is not formed on a substrate layer.

The non-pressure-sensitive adhesive region may be formed using a method of partly masking the non-pressure-sensitive adhesive material, for ease of formation of a pressure-sensitive adhesive layer, but the present invention is not limited thereto.

The pressure-sensitive adhesive layer may be designed to have a proper peel strength. For example, when the peel strength is below the range used to realize a desired 3D form, the pressure-sensitive adhesive layer does not properly support a stress caused by deformation, for example, swelling, of the substrate layer, which makes it difficult to peel the tape or realize the 3D form. On the other hand, when the peel strength exceeds this range, the pressure-sensitive adhesive layer may excessively suppress the deformation of the substrate layer, which also makes it difficult to realize the 3D form. The peel strength of the pressure-sensitive adhesive layer may be, for example, 100 gf/25 mm or more, 150 gf/25 mm or more, 200 gf/25 mm or more, 300 gf/25 mm or more, 400 gf/25 mm or more, 500 gf/25 mm or more, 600 gf/25 mm or more, 700 gf/25 mm or more, 800 gf/25 mm or more, 900 gf/25 mm or more, 1,000 gf/25 mm or more, 1,100 gf/25 mm or more, 1,200 gf/25 mm or more, 1,300 gf/25 mm or more, 1,400 gf/25 mm or more, 1,500 gf/25 mm or more, 1,600 gf/25 mm or more, 1,700 gf/25 mm or more, or 1,800 gf/25 mm or more. However, the peel strength of the pressure-sensitive adhesive layer may, for example, vary according to the size of the 3D form to be realized or the gap to be filled, but the present invention is not particularly limited thereto. The peel strength may be, for example, a peel strength with respect to one of subjects forming a gap to be filled, for example, a peel strength with respect to an electrode assembly, or a peel strength with respect to a glass plate. Also, the peel strength may be a peel strength measured at room temperature, and a peel strength measured at a peel rate of 5 mm/sec and a peel angle of 180°.

Also, the peel strength of the pressure-sensitive adhesive layer may be adjusted in consideration of the probability of realizing a desired 3D form, and an upper limit of the peel strength is not particularly limited.

Various kinds of pressure-sensitive adhesive layers may be used as the pressure-sensitive adhesive layer. For example, an acrylic pressure-sensitive adhesive, a urethane pressure-sensitive adhesive, an epoxy pressure-sensitive adhesive, a silicon pressure-sensitive adhesive or a rubber-based pressure-sensitive adhesive may be used for the pressure-sensitive adhesive layer.

According to one exemplary embodiment, the pressure-sensitive adhesive layer may be an acryl pressure-sensitive adhesive layer, and may, for example, include an acryl polymer cross-linked by a multifunctional cross-linking agent.

For example, an acryl polymer having a weight average molecular weight ($M_w$) of 400,000 or more may be used as the acryl polymer. Here, the weight average molecular weight is based on the standard of the weight of polystyrene measured using gel permeation chromatography (GPC). Unless otherwise particularly defined in this specification, the term "molecular weight" means weight average molecular weight. An upper limit of the molecular weight of the acryl polymer is not particularly limited, and the molecular weight of the acryl polymer may be, for example, controlled in a range of 2,500,000 or less.

The acryl polymer may be, for example, an acryl polymer including a (meth)acrylic acid ester monomer and a copolymerizable monomer having a cross-linking functional group in a polymerized form. As such, a weight ratio of each monomer is not particularly limited. For example, the weight ratio of each monomer may be designed in consideration of a desired peel strength.

For example, an alkyl(meth)acrylate may be used as the (meth)acrylic acid ester monomer included in the acryl polymer, and an alkyl(meth)acrylate containing an alkyl group having 1 to 14 carbon atoms may be used in consideration of the cohesion, glass transition temperature or pressure-sensitive adhesivity of a pressure-sensitive adhesive. Such a monomer that may be used herein may include, but is not limited to, methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate and tetradecyl(meth)acrylate, which may be used alone or in combination.

The copolymerizable monomer having a cross-linking functional group may be a monomer that can be copolymerized with the (meth)acrylic acid ester monomer or another monomer included in the acryl polymer and provide a cross-linking point, which may react with a multifunctional cross-linking agent, to the main chain of the polymer after the copolymerization. As such, the cross-linking functional group may be a hydroxyl group, a carboxyl group, an isocyanate group, a glycidyl group or an amide group. Alternatively, the cross-linking functional group may be a light cross-linking functional group such as an acryloyl group or methacryloyl group. The light cross-linking functional group may be introduced by allowing a compound having a light cross-linking functional group to react with a cross-linking functional group provided by the copolymerizable monomer. A variety of copolymerizable monomers that may be used according to a desired functional group in manufacture of the pressure-sensitive adhesive are widely known in the art. Examples of such a monomer may include, but are not limited to, a monomer having a hydroxyl group, such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate; a monomer having a carboxyl group, such as (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid and a maleic anhydride; glycidyl(meth)acrylate, (meth)acrylamide, N-vinylpyrrolidone or N-vinylcaprolactam. Here, one or two or more monomers may be included in the polymer.

The acryl polymer may further include another functional comonomer in a polymerized form, as necessary. Examples of the acryl polymer may include a monomer represented by the following Formula 1.

Formula 1

In Formula 1, $R_1$ to $R_3$ each independently represent hydrogen or an alkyl group, and $R_4$ represents a cyano group, a phenyl group unsubstituted or substituted with an alkyl group, an acetyloxy group, or $COR_5$ provided that $R_5$ represents an amino or glycidyloxy group unsubstituted or substituted with an alkyl or alkoxyalkyl group.

In definitions of $R_1$ to $R_5$ in Formula 1, the alkyl or alkoxy group refers to an alkyl or alkoxy group having 1 to 8 carbon atoms, preferably a methyl, ethyl, methoxy, ethoxy, propoxy or butoxy group.

Specific examples of the monomer of Formula 1 may include a vinyl ester of carboxylic acid, such as (meth)acrylonitrile, N-methyl(meth)acrylamide, N-butoxy methyl(meth)acrylamide, styrene, methyl styrene, or vinyl acetate, but the present invention is not limited thereto.

The acryl polymer may be prepared, for example, through a polymerization method such as solution polymerization, photo polymerization, bulk polymerization, suspension polymerization or emulsion polymerization.

Kinds of the multifunctional cross-linking agent that function to cross-link the acryl polymer in the pressure-sensitive adhesive layer are not particularly limited. For example, a suitable cross-linking agent may be selected from known cross-linking agents such as an isocyanate cross-linking agent, an epoxy cross-linking agent, an aziridine cross-linking agent, a metal chelate cross-linking agent and a light cross-linking agent, depending on the kinds of the cross-linking functional group present in the polymer. As such, examples of the isocyanate cross-linking agent may include a diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a reaction product of the diisocyanate and a polyol. In this case, trimethylol propane may be used as the polyol. The epoxy cross-linking agent that may be used herein may include ethyleneglycol diglycidylether, triglycidylether, trimethylolpropane triglycidylether, N,N,N',N'-tetraglycidyl ethylenediamine or glycerin diglycidylether, the aziridine cross-linking agent may include N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine) or tri-1-aziridinylphosphineoxide, the metal chelate cross-linking agent may include a compound obtained by coordinating a polyvalent metal with a compound such as acetylacetone or ethyl acetoacetate. Here, the polyvalent metal may include aluminum, iron, zinc, tin, titanium, antimony, magnesium or vanadium, and a multifunctional acrylate may be used as the light cross-linking agent. One, two or more cross-linking agents may be used in consideration of the kinds of the cross-linking functional group included in the polymer, as described above.

For example, a weight ratio of the multifunctional cross-linking agent in the pressure-sensitive adhesive layer may be adjusted in consideration of a desired peel strength.

Such a pressure-sensitive adhesive layer may be formed, for example, by coating a coating solution obtained by blending such an acryl polymer and the multifunctional cross-linking agent and inducing a cross-linking reaction between the polymer and the multifunctional cross-linking agent under proper conditions.

The pressure-sensitive adhesive layer may contain at least one additive selected from the group consisting of a coupling agent, a tackifier, an epoxy resin, a UV stabilizer, an antioxidant, a toning agent, a reinforcing agent, a filler, an antifoaming agent, a surfactant and a plasticizer, as long as the pressure-sensitive adhesive layer does not diminish desired effects.

A thickness of the pressure-sensitive adhesive layer may be properly selected according to its application, for example, according to a desired peel strength, the probability of becoming a 3D form or the size of a gap to be filled, but the present invention is not particularly limited thereto.

The tape may further include a release sheet attached to the pressure-sensitive adhesive layer to protect a pressure-sensitive adhesive layer before use of the tape.

Another aspect of the present invention provides a method of manufacturing the swelling tape. The method according to one exemplary embodiment may include forming a pressure-sensitive adhesive layer, which includes a pressure-sensitive adhesive region and a non-pressure-sensitive adhesive region, on at least one surface of a substrate layer. As such, the substrate layer may be a substrate layer that may deform, for example, swell, in a longitudinal direction when coming in contact with a fluid, as already described above. Also, the pressure-sensitive adhesive layer may be formed in a direction parallel to the longitudinal direction of the substrate layer.

A method of forming a pressure-sensitive adhesive layer on a substrate layer is not particularly limited. For example, a pressure-sensitive adhesive layer may be formed by coating a substrate layer with a pressure-sensitive adhesive composition prepared by properly blending the above-described pressure-sensitive adhesive components according to a desired kind of pressure-sensitive adhesive layer, or a pressure-sensitive adhesive coating solution prepared using the composition, using a tool such as a bar coater and curing the pressure-sensitive adhesive composition or the pressure-sensitive adhesive coating solution. The curing of the pressure-sensitive adhesive composition or the pressure-sensitive adhesive coating solution means a process of converting a pressure-sensitive adhesive composition into a phase that can exert a pressure-sensitive adhesive property through a physical or chemical reaction. Such a curing may be carried out by keeping the composition at a predetermined temperature for a certain period of time according to components of the composition used, or by irradiating the composition with electromagnetic waves such as UV rays. These methods of preparing a pressure-sensitive adhesive are widely known.

As such, a method of forming a pressure-sensitive adhesive layer in which the pressure-sensitive adhesive region and the non-pressure-sensitive adhesive region are formed together as described above is also not particularly limited. For example, the method that may be used herein may include a method of partly masking a pressure-sensitive adhesive layer by printing a surface of a coating layer of a pressure-sensitive adhesive composition or a pressure-sensitive adhesive coating solution before or after the curing process in consideration of a desired shape; a method of adjusting a curing degree of a coating layer to partially different levels by the way of spot radiation of electromagnetic waves or radiation of the electromagnetic waves using a mask that can cut off electromagnetic waves partially, or a method of performing partial coating and curing of a pressure-sensitive adhesive composition or a pressure-sensitive adhesive coating solution itself.

In one exemplary procedure, the pressure-sensitive adhesive layer may be formed using a method that includes coating a substrate layer with a pressure-sensitive adhesive composition and printing a non-pressure-sensitive adhesive material on the coated pressure-sensitive adhesive composition or a pressure-sensitive adhesive layer formed of the composition, in consideration of ease of processing.

A method of printing a non-pressure-sensitive adhesive material or a printing thickness is not particularly limited, and may be selected in consideration of materials used.

Still another aspect of the present invention provides a method of filling a gap. The method according to one exemplary embodiment may be a method of filling a gap formed by a first substrate and a second substrate spaced apart from the first substrate. For example, the method may include attaching a pressure-sensitive adhesive layer of the swelling tape to the first or second substrate, and deforming, for example, swelling, a substrate layer in a longitudinal direction by contact of the swelling tape with the substrate layer.

For the method, specific kinds and shapes of the first and second substrates having a gap formed therebetween are not particularly limited. That is, all kinds of substrates may be included within the scope of the first and second substrates as long as they can form a gap to be filled and a fluid can be introduced into the gap.

Also, a shape of the substrate is not particularly limited. For example, all substrates having a curved or irregular shape as well as a flat shape as shown in FIG. 1 may be included within the scope of the substrates. According to one exemplary embodiment, a width of the gap formed by the first and second substrates may be in a range of 0.001 mm to 2.0 mm, 0.001 mm to 1.00 mm, or 0.01 mm to 0.5 mm, but the present invention is not limited thereto.

As shown in FIG. 1, the method may be performed by swelling the tape (101) by contact of the substrate layer with a fluid in a state in which the tape (101) is attached via a pressure-sensitive adhesive layer to one of the first and second substrates (103, 104) having a gap formed therebetween, thereby forming a tape (102) having a 3D form. In this procedure, the 3D form may be controlled by adjusting a peel strength of the pressure-sensitive adhesive layer, a pressure-sensitive adhesive property of a surface of the pressure-sensitive adhesive layer, a shape and pattern of the non-pressure-sensitive adhesive region and/or a stress of the substrate layer.

According to one exemplary embodiment, one of the first and second substrates used in the method may be an electrode assembly for batteries, the other may be a can configured to accommodate the electrode assembly, and the fluid coming in contact with the swelling tape may be an electrolyte included in the battery. In this case, the present invention is directed to providing an electrode assembly to which the swelling tape is attached.

In the case described above, the method may be, for example, performed by attaching the swelling tape to an electrode assembly, accommodating the swelling tape in a can and injecting an electrolyte into the can.

Specific kinds of the electrode assembly are not particularly limited, and may include all general assembly used in the art. According to one exemplary embodiment, the electrode assembly may be an electrode assembly for secondary batteries, for example, for lithium secondary batteries.

The electrode assembly includes a positive electrode plate, a negative electrode plate and a separator formed between the positive electrode plate and the negative electrode plate. In the method, the swelling tape may be attached to an outer circumferential surface of the electrode assembly via the pressure-sensitive adhesive layer. As necessary, the electrode assembly may be wound in a jelly-roll shape.

The positive electrode plate may include a positive electrode collector composed of a thin metal plate having excellent conductivity, and a positive electrode active material layer coated on a surface of the positive electrode collector. Also, regions which are not coated with the positive electrode active material layer are formed at both end portions of the positive electrode plate, and positive electrode tabs which protrude upward or downward to a predetermined depth from the electrode assembly may be attached to the regions. The positive electrode tabs may function to electrically connect the electrode assembly with another region of the battery.

Also, the negative electrode plate may include a negative electrode collector composed of a conductive thin metal plate, and a negative electrode active material layer coated on a surface of the negative electrode collector. Like the positive electrode plate, regions which are not coated with the negative electrode active material layer are also formed at both end portions of the negative electrode plate, and negative electrode tabs which protrude upward or downward to a predetermined depth from the electrode assembly and may electrically connect the electrode assembly with another region of the battery may be attached to the regions.

Also, the electrode assembly may further include an insulation plate formed above and/or below a cap assembly or a cylindrical can to prevent contact with the cap assembly or the cylindrical can.

The swelling tape includes a finishing portion in which the outermost end portions of the separator are disposed at an outer circumferential surface of the electrode assembly, so that the swelling tape can be attached to the separator to surround the outer circumferential surface of the electrode assembly. Also, the swelling tape may be attached to the separator to cover at least 30% of the entire area of the outer circumferential surface of the electrode assembly. In this case, upper and lower end portions of the outer circumferential surface of the electrode assembly may be attached to the swelling tape so that the electrode assembly can be exposed to external environments.

Kinds of the can in which the electrode assembly is accommodated are not particularly limited. For example, kinds of the can known in the art may include a cylindrical can, etc.

Also, kinds of the fluid (i.e., an electrolyte solution) that functions to deform, for example, swell, the tape as described above are not particularly limited. However, electrolyte solutions known in the art may be used according to the kind of a battery. For example, when the battery is a lithium secondary battery, the electrolyte may, for example, include a water-insoluble organic solvent and a lithium salt. As such, the lithium salt may be dissolved in an organic solvent so that the lithium salt can function as a supply source of lithium ions in the battery and promote movement of the lithium ions between a positive electrode and a negative electrode. Examples of the lithium salt may include one, two or more salts such as $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein x and y are whole numbers), LiCl, LiI, and lithium bisoxalate borate as a supporting electrolyte salt. A concentration of the lithium salt in the electrolyte may vary according to its application. In general, the lithium salt may be used at a concentration of 0.1 M to 2.0 M. Also, the organic solvent serves as a medium through which ions participating in an electrochemical reaction of the battery can move. Examples of the organic solvent may include, but are not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R represents a linear, branched or cyclic hydrocarbon group having 2 to 50 carbon atoms, provided that the hydrocarbon group may include a double bond, an aromatic ring or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide and mevalonolactone, which may be used alone or in combination.

In the swelling tape, a pressure-sensitive adhesive layer having a predetermined peel strength is formed on a substrate layer having a deforming property, for example, a swelling property, as described above. Thus, the tape may take on the 3D form after application of the method, for example, in a state in which the tape is attached to the electrode assembly. As a result, the tape may effectively fill a distance between the electrode assembly and an inner wall of the can and anchor the electrode assembly so that slipping and shifting of the electrode assembly can be prevented.

That is, the "3D form" of the swelling tape described above is formed through interaction of a peel strength of the pressure-sensitive adhesive layer and a stress of the substrate layer of the swelling tape coming in contact with an electrolyte. As a result, the 3D form of the swelling tape may be subsumed within a concept including all structures that can tightly anchor the electrode assembly inside the can.

Figure 7:
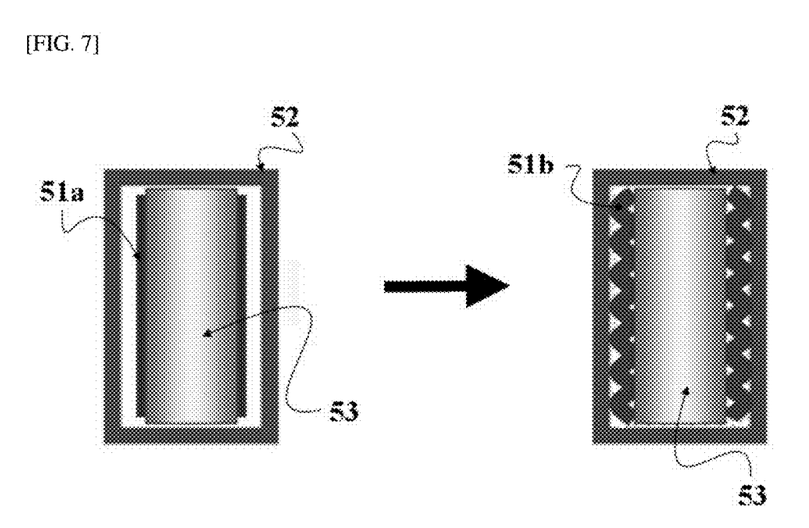
FIG. 7 is a schematic diagram showing a process of forming a swelling tape into a 3D form in manufacture of a battery.

FIG. 7 is a diagram of a battery prepared in the method according to one exemplary embodiment, showing that tapes (51a, 51b) for anchoring an electrode assembly are formed into 3D forms by means of an electrolyte to anchor an electrode assembly (53) in a can (52).

For example, as schematically shown in the left panel of FIG. 7, the swelling tape (51a) may be attached to the assembly (53) and then maintained flat when the assembly (53) is inserted into the can (52). However, as a predetermined time elapses after the swelling tape (51a) comes in contact with the electrolyte injected into the can (52), the swelling tape (53b) is formed into a 3D form, as schematically shown in the right panel of FIG. 3. Thus, a distance between the electrode assembly (53) and the can (52) may be filled, thereby anchoring the electrode assembly (53).

Still another aspect of the present invention provides a secondary battery including an electrode assembly attached to the swelling tape, a can configured to accommodate the electrode assembly, and an electrolyte coming in contact with the swelling tape inside the can. For example, such a battery may be manufactured using the method as described above. According to one exemplary embodiment, the battery may be a lithium secondary battery.

Advantageous Effects

The swelling tape can be applied inside a gap in which a fluid exists so as to fill the gap by becoming a 3D form, and can be useful at anchoring a subject in which the gap is formed, as necessary.

EXPLANATION OF MARKS 103, 104: Subject in which the gap is formed
101: Swelling tape before forming 3D shape
102: Swelling tape formed 3D shape
11: Substrate later 12: Pressure-sensitive adhesive layer
12A: Pressure-sensitive adhesive region
12B: Non-pressure-sensitive adhesive region
51a, 51b: Swelling tape
52: Can
53: Electrode assembly

BEST MODES OF THE INVENTION

Hereinafter, the tape, and the like will be described in further detail with reference to the following Examples and Comparative Examples, but the range of the tape is not limited to the following Examples.

1. Measurement of Modification Rate of Substrate Layers in Longitudinal Direction A substrate layer is cut into samples having a size of 10 cm×50 cm (length×width). The prepared samples are soaked in a carbonate-based electrolyte and kept at room temperature for a day in a sealed condition. Thereafter, the samples are pulled out of the electrolyte and lengths of the samples in a machine direction are measured. Then, a modification rate of the substrate layer in a longitudinal direction is calculated according to the following Equation A.

Modification rate in longitudinal direction=$(L_2-L_1)/L_1 \times 100$   Equation A In Equation A, $L_1$ represents an initial length (i.e., 50 mm) of a substrate layer in a machine direction before the substrate layer is soaked in an electrolyte, and $L_2$ represents a length of the substrate layer in a machine direction measured after the substrate layer is soaked in the electrolyte.

2. Measurement of Peel Strength of Swelling Tape

A swelling tape is cut into samples having a size of 25 cm×200 cm (length×width). The samples are attached to a glass plate via a pressure-sensitive adhesive layer using a 2 kg rubber roller, and stored at room temperature for 2 hours. Thereafter, peel strengths of the samples are measured using a tensile tester while peeling the swelling tape at a peel rate of 5 mm/sec and a peel angle of 180°.

3. Evaluation of Probability of Realizing 3D Form of Swelling Tape

The batteries prepared in Examples and Comparative Examples are kept at room temperature for a day, and dissembled to pull out electrode assemblies. The probability of becoming a 3D form is evaluated according to the following evaluation criteria by checking a state of the swelling tapes which were attached to the electrode assemblies.

Criteria for Evaluating Probability of Becoming a 3D Form

○: A uniform 3D form of a swelling tape is observed.
Δ: A uniform 3D form of a swelling tape is not observed.
x: A uniform 3D form of a swelling tape is not observed and the swelling tape is peeled off from an electrode assembly.

4. Evaluation of Gap-Filling Ability of Swelling Tape (Flow-Preventing Ability of Electrode Assembly)

In this case, the gap-filling ability of the swelling tape may be evaluated using a method of evaluating a property of preventing movement of an electrode assembly. For example, the evaluation method includes a method of evaluating frequent vibration and a method of evaluating frequent impact. The method of evaluating frequent vibration is performed according to a vibration test method, UN38.3 standard. After the evaluation, when battery power cuts off, a terminal is proven to be disconnected due to movement. In the case of the method of evaluating frequent impact, a battery is put into an octagonal cylinder and rotated for a predetermined time. Then, when battery power cuts off, a terminal is proven to be disconnected due to movement. The gap-filling ability of the swelling tape evaluated according to the method is evaluated according to the following evaluation criteria.

Criteria for Evaluating Gap-Filling Ability
○: Battery power is detected after evaluation of frequent vibration and frequent impact.
Δ: Battery power is detected after evaluation of frequent vibration and frequent impact but resistivity is increased by 10% or more.
x: Battery power is not detected after evaluation of frequent vibration and frequent impact.

Preparative Example 1: Preparation of Urethane-Based Substrate Layer

A composition including butanediol polyol and methylene diphenyl diisocyanate wherein a hydroxyl group of the polyol and an isocyanate group of the diisocyanate had an equivalent ratio of approximately 1:1 was formed into a film having a thickness of approximately 40 μm using a T-die, and cured to prepare a substrate layer. The prepared substrate layer had a modification rate of about 100% in a longitudinal direction.

Preparative Example 2: Preparation of Urethane Acryl-Based Substrate Layer 30 parts by weight urethane acrylate and 70 parts by weight of a diluent, isobornyl acrylate (IBOA), were blended, and 0.5 parts by weight of a photoinitiator (Irgacure-184, 1-hydroxy cyclohexyl phenylketone) was further added, mixed and defoamed to prepare a composition. The prepared composition was coated on a polyester release film using a bar coater to a thickness of approximately 40 μm. The resulting coating layer was covered with the polyester release film to prevent contact with oxygen, and the composition was then cured using a metal halide lamp by irradiating the composition with light of the UV-A region having a light intensity of 800 mJ/cm², thereby preparing a substrate layer. The prepared substrate layer had a modification rate of about 12% in a longitudinal direction.

Preparative Example 3: Preparation of Cellulose-Based Substrate Layer

A source material including a cellulose acetate propionate compound having a number average molecular weight (Mn) of 70,000 as measured using GPC was formed into a substrate layer having a thickness of about 40 μm using a T-die. The formed substrate layer had a modification rate of about 20% in a longitudinal direction.

Example 1

Preparation of Swelling Tape

A pressure-sensitive adhesive layer having a peel strength of 1,900 gf/25 mm with respect to a glass plate and a thickness of 15 μm was formed on one surface of the substrate layer (thickness: 40 μm) prepared in Preparative Example 1 as an acrylic pressure-sensitive adhesive layer which included an acryl pressure-sensitive adhesive resin cross-linked by an isocyanate cross-linking agent, to thereby prepare a swelling tape. A tape was prepared by coating a non-pressure-sensitive adhesive material on the prepared pressure-sensitive adhesive layer using the printing method so that an adhesive area could amount to 22% level as shown in FIG. 4. Here, an acrylic compound having a glass transition temperature at which pressure-sensitive adhesive properties are not exhibited was used as the non-pressure-sensitive adhesive material.

Preparation of Electrode Assemblies and Batteries

The swelling tape was attached to a jelly-roll-shaped electrode assembly (sectional diameter: 17.2 mm) including a negative electrode, a positive electrode and a separator so that the swelling tape could cover approximately 50% of an area of an outer circumferential surface of the electrode assembly, and the electrode assembly was inserted into a cylindrical can (sectional diameter: 17.5 mm). Thereafter, a carbonate-based electrolyte was injected into the can and the can was sealed to manufacture a battery.

Examples 2 to 4 and Comparative Examples 1 and 2

Swelling tapes and batteries were prepared in the same manner as in Example 1, except that substrate layers were exchanged as listed in the following Table 1 in preparation of the swelling tape, a pressure-sensitive adhesive layer having the same composition as in Example 1 was changed so that a peel strength of the pressure-sensitive adhesive layer with respect to glass could be exerted as listed in the following Table 1, and a shape of the coated non-pressure-sensitive adhesive material or an area of the pressure-sensitive adhesive area was changed as listed in the following Table 1.

TABLE 1

|  |  | Example | | | | Comparative Example | |
|---|---|---|---|---|---|---|---|
|  |  | 1 | 2 | 3 | 4 | 1 | 2 |
| Substrate layer | Kind | Preparative Example 1 | Preparative Example 1 | Preparative Example 2 | Preparative Example 3 | PP | PET |
|  | Modification rate | 100 | 100 | 12 | 20 | 0 | 0 |
| Pressure-sensitive adhesive layer | Composition | Acrylic | Acrylic | Acrylic | Acrylic | Acrylic | Acrylic |
|  | Peel strength | 1900 | 800 | 150 | 120 | 1500 | 60 |
| Coated non-pressure-sensitive adhesive layer | Shape | FIG. 4 | FIG. 5 | FIG. 5 | FIG. 6 | FIG. 4 | FIG. 6 |
|  | Pressure-sensitive adhesive area (%) | 22 | 22 | 50 | 35 | 22 | 35 |

Modification rate: Modification rate of substrate layer in longitudinal direction (unit: %)
Peel strength: Peel strength with respect to glass plate (unit: gf/25 mm)
PP: Polypropylene substrate layer having modification rate of 0% in longitudinal direction (thickness: 40 μm)
PET: Polyethyleneterephthalate substrate layer having modification rate of 0% in longitudinal direction (thickness: 25 μm)

The measured physical properties of the swelling tapes and the batteries prepared in the Examples and Comparative Examples are summarized in the following Table 2.

TABLE 2

|  | Example | | | | Comparative Example | |
|---|---|---|---|---|---|---|
|  | 1 | 2 | 3 | 4 | 1 | 2 |
| Probability of realization of 3D form | ○ | ○ | ○ | ○ | Δ | Δ |
| Gap-filling ability (Flow-preventing ability) | ○ | ○ | ○ | ○ | x | x |

The swelling tape can, for example, be applied inside a gap in which a fluid exists so as to fill the gap by becoming a 3D form, and can be useful in anchoring a subject in which the gap is formed, as necessary.

While the invention has been shown and described with reference to certain exemplary embodiments thereof, it will be understood by those skilled in the art that various changes in form and details may be made therein without departing from the scope of the invention as defined by the appended claims.

The invention claimed is:

1. A secondary battery comprising:
   an electrode assembly comprising a swelling tape attached thereto;
   a can configured to accommodate the electrode assembly; and
   an electrolyte coming in contact with the swelling tape of the electrode assembly inside the can,
   wherein the swelling tape comprises:
      a substrate layer having a property of deforming in a longitudinal direction when coming in contact with a fluid, wherein the substrate layer contains a urethane bond, an ester bond or an ether bond, or includes a cellulose ester compound; and
      a pressure-sensitive adhesive layer that is formed on one surface of the substrate layer in a direction parallel to the longitudinal direction of the substrate layer, wherein the pressure-sensitive adhesive layer includes at least two pressure-sensitive adhesive regions and at least one non-pressure-sensitive adhesive region disposed between the at least two pressure-sensitive adhesive regions,
      wherein the pressure-sensitive adhesive region and the non-pressure-sensitive adhesive region are formed on a surface of the pressure-sensitive adhesive layer opposite to the substrate layer, and the non-pressure-sensitive adhesive region is embedded in the pressure-sensitive adhesive layer.

2. The secondary battery of claim 1, wherein the swelling tape has a three-dimensional (3D) structure having a height of 0.001 mm to 2.0 mm in a direction perpendicular to the longitudinal direction when coming in contact with the fluid.

3. The secondary battery of claim 1, wherein the substrate layer has a modification rate of 10% or more in the longitudinal direction according to the following Equation 1:

Modification rate in longitudinal direction=$(L_2-L_1)/L_1 \times 100$     Equation 1 wherein $L_1$ represents an initial length of the substrate layer before the substrate layer comes in contact with a fluid, and $L_2$ represents a length of the substrate layer measured after the substrate layer comes in contact with the fluid at room temperature or 60° C. for 24 hours.

4. The secondary battery of claim 1, wherein a ratio of an area of the pressure-sensitive adhesive region to the entire area of a surface of the pressure-sensitive adhesive layer is in a range of 5% to 95%.

5. The secondary battery of claim 1, wherein the pressure-sensitive adhesive layer is a single-layered pressure-sensitive adhesive layer.

6. The secondary battery of claim 5, wherein a distance between the pressure-sensitive adhesive regions is in a range of 0.1 mm to 10 mm.

7. The secondary battery of claim 1, wherein the pressure-sensitive adhesive region or the non-pressure-sensitive adhesive region is disposed to form a striped pattern; or the pressure-sensitive adhesive region and the non-pressure-sensitive adhesive region are formed in a sea island pattern.

8. The secondary battery of claim 1, the pressure-sensitive adhesive layer comprises a non-pressure-sensitive adhesive material that forms the non-pressure-sensitive adhesive region by partly masking the pressure-sensitive adhesive layer.

9. The secondary battery of claim 1, wherein the pressure-sensitive adhesive layer has a peel strength at room temperature of 100 gf/25 mm or more, as measured at a peel angle of 180° and a peel rate of 5 mm/sec with respect to either an electrode assembly or glass plate having the gap formed therein.

10. The secondary battery of claim 1, wherein the pressure-sensitive adhesive layer includes an acrylic pressure-sensitive adhesive, a urethane pressure-sensitive adhesive, an epoxy pressure-sensitive adhesive, a silicon pressure-sensitive adhesive or a rubber pressure-sensitive adhesive.

11. The secondary battery of claim 1, wherein the swelling tape has a 3D structure formed by means of the electrolyte, and functions to anchor the electrode assembly in the can.

12. The secondary battery of claim 1, wherein the at least one non-pressure-sensitive adhesive region forms a striped pattern.

13. The secondary battery of claim 1, wherein the at least two pressure-sensitive adhesive regions and the at least one non-pressure-sensitive adhesive region form a sea island pattern.

* * * * *